United States Patent [19]

Wright

[11] Patent Number: 4,956,705

[45] Date of Patent: Sep. 11, 1990

[54] ELECTRONIC METHOD AND APPARATUS FOR STEREOSCOPIC PHOTOGRAPHY

[75] Inventor: Douglas Wright, S. Farmingdale, N.Y.

[73] Assignee: Dimensional Visions Group, Philadelphia, Pa.

[21] Appl. No.: 321,921

[22] Filed: Mar. 10, 1989

[51] Int. Cl.[5] .............................................. H04N 13/00
[52] U.S. Cl. ...................................... 358/88; 358/225; 358/229
[58] Field of Search ...................... 358/88, 3, 225, 229; 354/112

[56] References Cited

U.S. PATENT DOCUMENTS

| | | | |
|---|---|---|---|
| 3,491,669 | 1/1970 | McBride | 354/112 |
| 3,527,880 | 9/1970 | Gordon | 358/88 |
| 4,086,585 | 4/1978 | Wah Lo | 354/114 |
| 4,541,007 | 9/1985 | Nagata | 358/3 |
| 4,613,899 | 9/1986 | Kuwano | 358/88 |
| 4,724,449 | 2/1988 | Wright | 354/112 |
| 4,754,327 | 6/1988 | Lippert | 358/88 |
| 4,807,024 | 2/1989 | McLaurin | 358/88 |

Primary Examiner—Howard W. Britton
Attorney, Agent, or Firm—Darby & Darby

[57] ABSTRACT

A method and apparatus for electronically taking photographs of an object to be used for stereoscopic (three dimensional) reproductions of the object in which an electronic camera takes a plurality of electronic photographs of an object from each of a plurality of predetermined spaced positions relative to the object. The photographic image is converted into a video signal which is digitized and the digitized video signals of the images from the plurality of positions are utilized to produce a viewable representation of the object. In a preferred embodiment, the camera has a generally planar element for converting the image into the video signal and the planar converting element of the camera at each position is held in a common plane and the lens system for the camera at each position is kept in a plane generally parallel to the converting element plane and shifted relative to the image converting element of the camera to compensate for the different positions to have the same field of view at each position.

34 Claims, 4 Drawing Sheets

ELECTRONIC METHOD AND APPARATUS FOR STEREOSCOPIC PHOTOGRAPHY

BACKGROUND OF THE ART

In prior U.S. Pat. No. 4,724,449 granted Feb. 9, 1988, which is assigned to Dimensional Visions Group, Ltd., a system is disclosed for taking and producing three-dimensional photographs. The preferred embodiment disclosed in that patent uses a single film-type camera at a plurality of positions or a separate film type camera at each of said positions for photographing an object. The system operates such that the single camera used at each position or the dedicated cameras at the plurality of positions are mounted such that their film planes are in the same plane at the time that each takes its picture. The picture taken by each of the cameras has the same field of view with the same field of view extremities relative to the object and the same focus point on the object relative to a line from the center of the lens. Due to the spatial positioning of the various positions at which the pictures are taken, a number of negatives are produced which spatially correspond to the different camera locations.

By suitably processing the negatives of the photographs taken and utilizing a lenticular sheet on the top thereof, superior three-dimensional photographs of the object can be produced.

The system of the aforesaid U.S. Pat. No. 4,724,449 differs from other systems for producing three-dimensional photographs, e.g., taking two pictures from different angles through lenses with different colored filters and providing the viewer with glasses having different color lenses to view the photographs; or using a plurality of cameras located side by side on the same image plane directed straight ahead so that the optical center for each camera is not the same and a slightly different picture of the same object is taken by each camera (Wah U.S. Pat. No. 4,086,585); or one using a plurality of cameras spaced around the object in the central focal line of each camera's lens passing through the center of the object whose picture is to be taken (McBride U.S. Pat. No. 3,491,669).

While the system of the aforesaid U.S. Pat. No. 4,724,449 is fully operative, it is somewhat inflexible from the point of view that more or less conventional cameras are used in which paper-type negatives (e.g., silver halide type negatives) are produced. There is no easy and efficient way to centrally monitor that each of the cameras is truly in registration at all times so that the desired field of view is being photographed. In addition, the composition of the film negatives from the point of view of color or other film negative and developed photograph characteristics, is limited solely by the optical constraints of the film cameras, the film, and the film developing processing, and photograph printing apparatus.

BRIEF DESCRIPTION OF THE INVENTION

The present invention is directed to an electronic system and method of use for taking three-dimensional pictures of an object. In accordance with the invention, a plurality of electronic cameras are utilized, one camera at each position from which a picture is to be taken or a single camera which is moved to each of the positions. The electronic camera at each position has an imaging device located in an image plane. In the case of an electronic camera the imaging device is an array of electronic elements to convert the received light image of the object into electronic signals, for example, charge coupled diodes (CCD). At each position at which an electronic image is to be produced, the camera's electronic image plane is oriented to be in the same plane and preferably along a straight line. Each electronic camera also has an optical system for adjusting the depth and size of its field of view so that the camera at each position can produce an electronic image with the same field of view with the same extremities but from a different spatial location.

The electronic image output produced the camera at each station is a video signal which is supplied to a system which includes a monitor and a digital computer. A control system is provided which operates in conjunction with the monitor to adjust the optics of each camera, or of the single camera at each position, so that the desired field of view is captured by each camera, that is, there is registration of the images by the camera at each different spatial position.

The electronic image video signal output of the camera at each station is read out electronically into an image capture (frame grabber) type system in which each image is digitized so that it can be processed by computer technology. That is, the digitizer electronic image content can be modified. The digital image of each picture can be used to make a hard copy output or directly stored in electronic memory or modified before storage.

The electronic images from the cameras at the various stations of the system can be reproduced onto a film type negative or, alternatively, the electronic information from the stored digitized image can be used to directly set up and operate a printing machine.

The composite photograph from the plurality of images are processed into the three-dimensional photograph, in the manner previously described in the aforesaid patent.

OBJECTS OF THE INVENTION

It is therefore an object of the invention to provide an electronic system for the production of three-dimensional photographs.

A further object is to provide an electronic system for producing three-dimensional photographs in which a plurality of electronic cameras are utilized with the electronic image plane of each of the cameras being in the same plane and each camera producing an electronic image of the object with the same depth and field of view.

A further object is to provide a system for electronically taking three-dimensional photographs in which an electronic image is produced of an object by a plurality of electronic cameras which are spaced relative to the object with the image plane of each camera being in the same plane and thereafter electronically digitizing the images for viewing, electronic modification or storage in electronic memory for further use.

Yet another object is to provide an electronic system for three-dimensional photographs in which a video camera is provided at each of a plurality of positions with the image plane of each of the cameras being in the same plane and the optical system of each camera having the same field of view, in which the images can be electronically registered.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
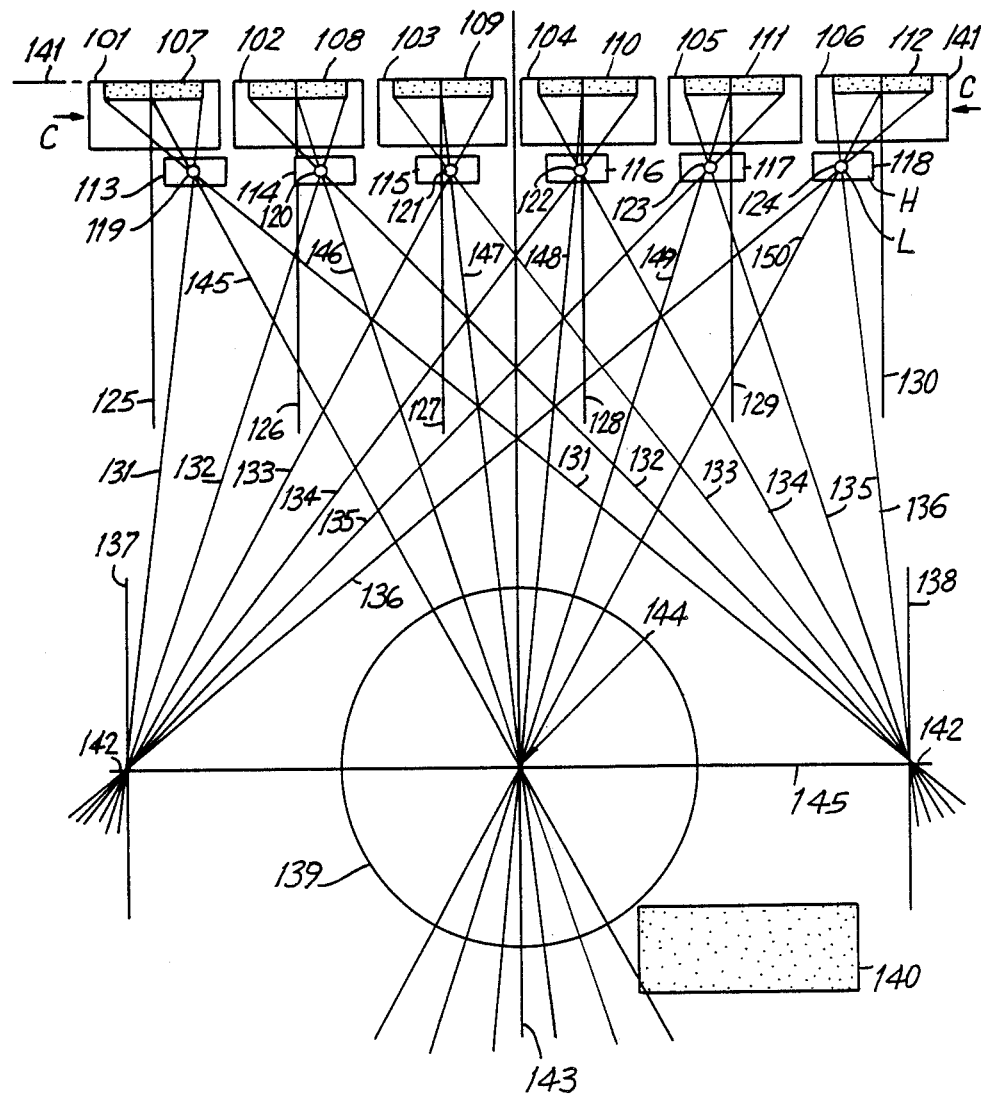
FIG. 1 is an overall plan view of the system showing the configuration of the video cameras relative to the object whose picture is being taken.

FIG. 1 shows an overall schematic top view of the invention for taking a plurality of electronic photographs, either successively or simultaneously, of a three-dimensional object 139 which is shown illustratively as a sphere to portray the three-dimensional character of the object. It should be understood that the object 139 also extends into and out of the plane of the paper. The three-dimensional object 139 has a focus point 144 at its center. A background object 140 is shown for reference purposes.

Reference numerals 101–106 show a plurality of different positions of a single electronic camera body C, which is progressively shifted to the different positions, or a plurality of electronic camera bodies which are located in the positions, from which the different pictures of the object 139 are to be taken. In practicing the invention, the image plane of the camera body or bodies C to be described below, at all of its (their) positions 101–106 are in the same plane and lie along the same straight line 141. The camera at each position 101–106 has an electronic imaging device array in an imaging plane 107–112 for converting the received image of the object into electronic (video) signals.

The imaging device array is a square or rectangular array of electronic elements, for example charge coupled diodes, photodiodes, etc., for converting received light in the video signals. The electronic state of each of the numerous elements of the array is scanned so that the picture imaged on the array of elements is converted into a composite electronic video signal which corresponds to the picture. Depending upon the type of camera, the video output signal can be either in color or black and white. This video signal can be used directly and/or recorded on a suitable medium, e.g. a video cassette recorder, displayed or utilized by a computer system. The camera is conventional in the art.

The image plane of the electronic camera at each of the positions 101–106 at which the electronic picture is taken is located in the same plane relative to the camera body. Six positions 101–106 are illustratively shown although fewer or more can be used. Four positions and four images produce reasonably satisfactory results and the addition of more positions increases the quality of the final picture.

Each camera at each position has an optics system S. The optics system S basically comprises a lens L, a holder H and a motorized mechanism for adjusting the focal length of the lens and for shifting its holder H horizontally and vertically relative to the camera body. This is described below with reference to FIG. 3. Where a plurality of cameras are used, the optics package for each camera preferably has the same characteristics.

The electronic camera image plane line 141 is parallel to a straight line 145 forming the object plane passing through the extremities 142 of the angular field of the camera lens L at each camera position 101–106, as described below. Where a single electronic camera is used which is shifted into the plurality of successive positions 101–106, such as from left to right relative to the object, there preferably is a common support rail for defining image plane line 141, or a line parallel to it, along which the camera moves. The same holds true where a plurality of cameras are used.

As seen in FIG. 1, at each of the successive positions, 101–106, the image array in the camera body is shifted in spatial location relative to the object. That is, in going from left to right across the figure, the location of the image array onto which the object is imaged changes relative to the object. A respective line 125–130 drawn perpendicular to the image plane of the image array of the camera at each location shows the shift from left to right.

In accordance with the invention, the position of the lens of the electronic camera is changed at each location relative to the camera body and the image plane of the image array so that the same field of view is photographed from each camera location 101–106. This is done by adjustment of the lens focal length and position relative to the camera body, the latter being done generally in a plane parallel to the plane of the film, so that the picture of the object will be taken relative to the extremities 142 of the field of view of the lens at each camera position 101–106. Lines 137 and 138 represent the left and right viewing extremities of the camera lens and the frame of the plane of the image array of each camera at each of the positions 101–106.

In going from camera positions 101–106, the position of the lens is moved, by shifting its lens holder H relative to the camera body by a different amount in a manner to be described below, to the successive lens positions 113–118, corresponding to the camera positions 101–106.

Each of reference numerals 119–124 indicates the lens center relative to the center of the image array of its corresponding camera, illustrated by a corresponding center line 125–130, at each of the various camera body positions 101–106 going from left to right. For example, referring to the left-most camera position 101, the lens holder is shifted to the right of the center of the image plane of the image array by a distance between the point 119, where the lens center actually is, to the point 125 where it would normally be, i.e., at the center of the image plane of the image array as shown by line 125. Similarly, in camera position 102, the lens is shifted closer to the image array center line 126 where it would normally be, and in camera position 103 it is even closer to the image array center line 127.

As the camera position is moved past the center of the arrangement, i.e., past a line 143 extending transversely from the center of the object which extends through the object center focus point 144, the lens is shifted to the other side of the image array center line. For example, at camera position 104, the lens at position 122 is to the left of the image array center line 128. The lens is progressively moved further to the left relative to the camera body to position 123 in camera position 105 further to the left of the image array center line 129. The lens is moved to its most extreme position 124 to the left of the image array center line 130 in camera position 106.

It should be noted that in each of the successive camera positions 101-106, the camera lens defines a field of view having corresponding left and right image view extremities respectively designated by the pair of lines 131, 132, 133, 134, 135 and 136 for the corresponding camera position 101-106. For example, the line pair 131 shows the field of view with the lens shifted to the right by the maximum amount relative to the camera body in the left-most camera position 101. In camera position 102 lines 132 show the extremities of the field of view. With the camera body in the extreme right position 106, the lens is in the maximum position 118 to the left, and the lens field of view is defined by the line pair 136. In each camera position, the extremities of the field of view defined by the line pairs 131 through 136 pass through the same extremity points 142 where the object plane line 145 intersects the field of view extremity lines 137-138. Thus, the field of view at each camera position 101-106 which is imaged on the camera image array at that position is the same.

As seen in FIG. 1, as the camera position shifts from left to right the center line of the field of view for the corresponding positions 101 through 106 is designated by the corresponding lines 145 through 150. Each of the center lines passes through the object focus point 144 on the object plane line 143. Thus, as should be clear, in each of the positions 101-106 of the camera body the same field of view exists as defined by the extremities 137, 138 and there is the same focus point 144 for the object.

Figure 2:
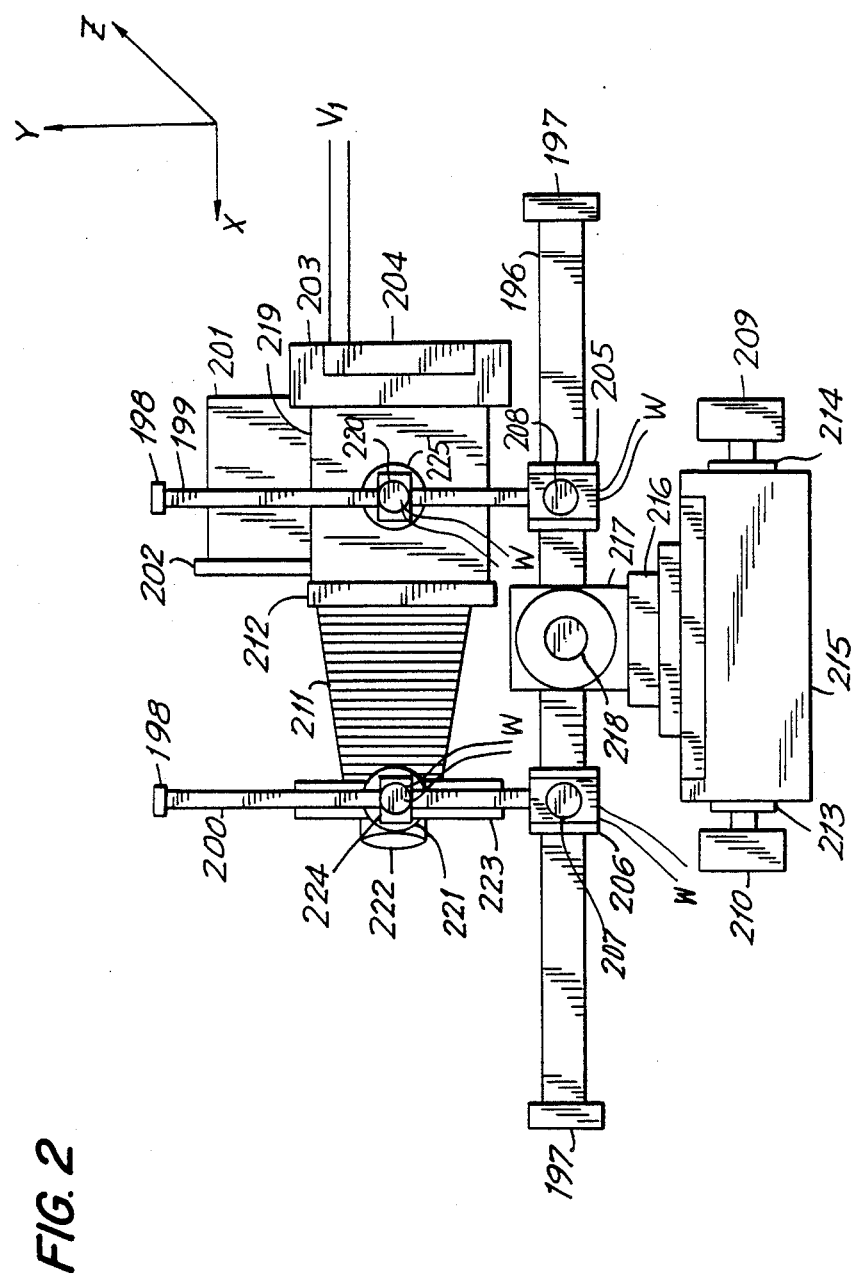
FIG. 2 is a view of a camera assembly.
Figures 3A, 3B:
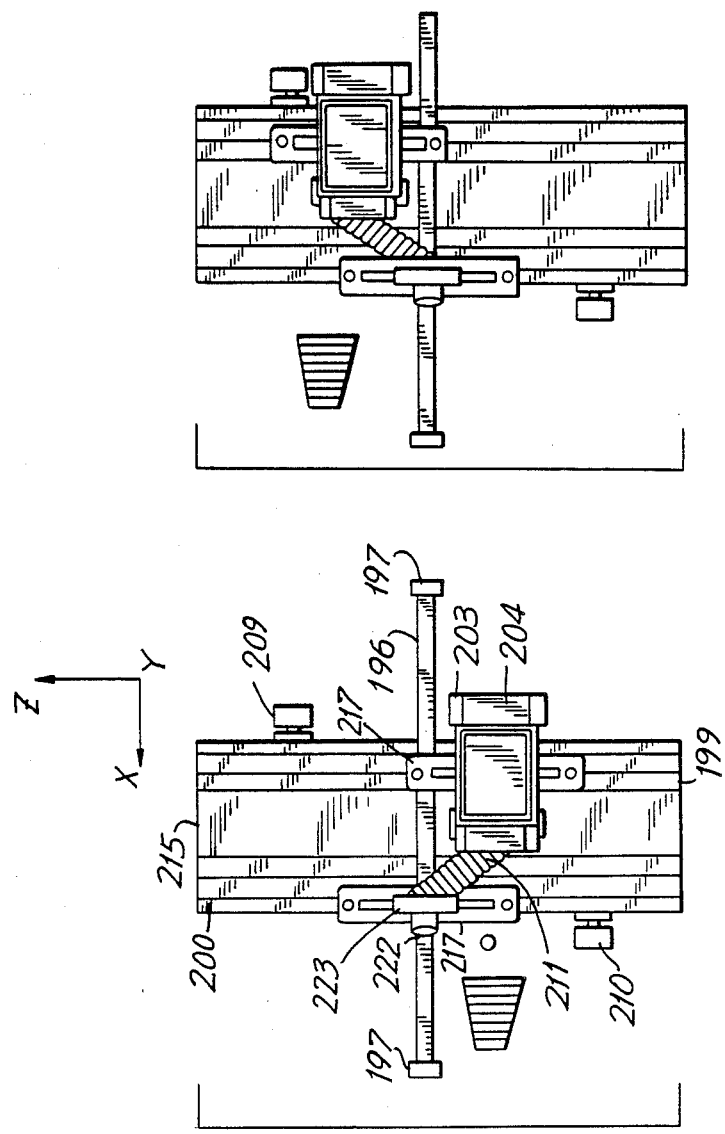
FIGS. 3A and 3B are views of an arrangement for mounting a plurality of cameras.

FIGS. 2, 3A and 3B show some of the details of one of the cameras or one of the plurality of cameras used with the present invention including the mechanism for various adjustments to obtain the desired images on the image array at each of the different camera locations 104-106 in FIG. 1. FIG. 2 is a side view and FIGS. 3A-3B is a top view.

The arrangement includes a horizontal support rail 196 having end caps 197 thereon so that the camera body 219 and related position adjusting mechanism will not travel off of the rail. The electronic image array is mounted within the camera body, illustratively shown at 204. Lead wires V1 separate the various wires for supplying power to the camera and for providing its video signal output.

A rail 196 is part of a rack and pinion arrangement 207 which is preferably of the vernier type and is motor driven which permits the camera body 219 having a light-tight bellows 211 between it and the camera and lens 224 to be moved as a unit relative to the rail 196 in the ±X direction for focusing the lens relative to the film. This effectively varies the lens focal length.

Toward the back (right) of the rail 196 is a back rail vernier bracket 205 on which is traversely mounted a vertical support post 199 having an end cap 198 at the top thereof. Post 199 also is part of a motor driven vernier controlled rack and pinion.

The camera body 219 has a height adjustment bracket 225 attached thereto which is moved, for example by a motor controlled vernier type pinion, along vertical support post 199. Rack 225 has a lock 220 so that the camera body can be precisely vertically adjusted (±Y direction) and held relative to the vertical support post 199.

A bellows bracket 212 is attached to the front of the camera body from which bellows 211 extends. A lens holder 223 with a lens is mounted on the front of the bellows 211. Adjustment of the lens 223 and the bellow 211 is effected in the ±Y direction by a motor driven vernier type support bracket 221 which travels along a vertical support post 200 which is mounted in a vernier type adjustment support bracket 206 on the rail 196. The lens support bracket 221 has a lock 224 to set its vertical position along support post 200.

As seen in FIGS. 3A and 3B, support rails 207 and 208 extend horizontally in the Z direction from the support brackets 196, 197. Rails 207, 208 are also of the rack type having the vertical support posts 200, 199 mounted thereon by suitable motor drive vernier adjustments so that post 199, 200, which have the camera body and lens holder connected thereto can be moved along the rails 207, 208 in the ±Z direction (relative to FIG. 2). This provides for the lateral shifting of the lens relative to the image array in the camera body as described with respect to FIG. 1. FIG. 4A shows the lens to the right of the camera body and FIG. 4B shows it to the left.

As seen, the camera body 219 and bellows 211 and lens 222 combination are independently adjustable relative to the support rail 196 in the ±X direction (FIG. 2) via the support brackets 205, 206 which ride on the rail 196; in the ±Y direction along the two vertical posts 199 and 200 via the brackets 224 and 225; and in the ±Z direction along the horizontal rails 207, 208. Lead wires W for the motors of the various vernier motor contacts are shown. The motors are operated from a remote control site in conjunction with a monitor, as described below. Thus, the center of the lens can be moved in any direction relative to the plane of the image array in the camera body, and vice versa.

The support brackets 220 and 224 which ride on the vertical support posts 199 and 200 are also made to permit angular adjustment of the camera body 219 and the lens, i.e., arcuate movement in the x-z plane.

The complete camera assembly and the various elements for adjusting the camera body and lens relative to each other in the X, Y and Z directions is mounted on a main support bracket 217 which carries the horizontal rail 196. Bracket 217 is mounted on a main support track 215 of the rack and pinion vernier type which can have scale markings therealong and having an adjustment control 209 with a lock 210. The adjustment control can be motorized if desired. This arrangement permits a single camera to be moved along the length of track 215 to the plurality of positions shown in FIG. 1. It also permits each of a plurality of cameras to be adjusted along the length of the track (±Z direction).

The apparatus of FIGS. 2 and 3 permit the lens to be adjusted relative to the camera image array plane to achieve proper focus and also to provide the lateral adjustment shown in FIG. 1. Also, the vertical position of the camera and lens can be set to accommodate for objects of various heights. Accordingly, electronic image capture of the type referred to in FIG. 1 can be made with precision.

ELECTRONIC SYSTEM

Figure 4:
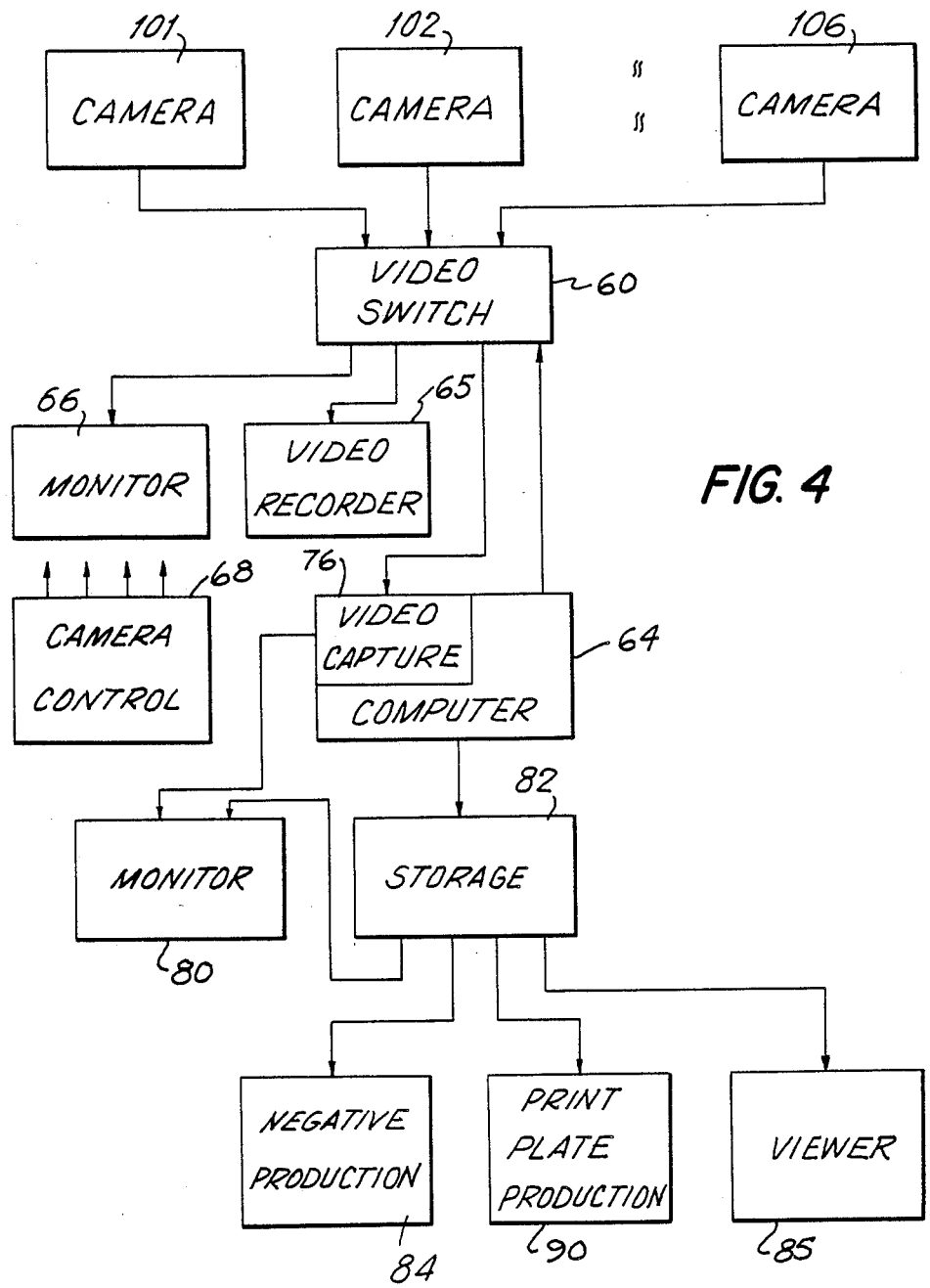
FIG. 4 is a functional block diagram of the electronic portion of the system.

FIG. 4 shows a schematic block diagram of a preferred embodiment of the electronic system. The electronic output from the image array of each of the cameras C is supplied to a video switch 60. The video switch has one output to a digital computer 64, another to a video recorder 65 and another output to a video monitor 66. The video switch 60 is under the control of the computer so that it can select which output from the camera at the various stations 101–106 is to be received and processed.

A camera control 68 having four output control lines is provided in association with a control panel. Four of the control lines W operate the various motors for moving the parts of the camera, or cameras, as described with respect to FIGS. 2 and 3 and the fifth control line to operate the electronics for the camera. By operating the video switch 60 the output of one camera can be sampled at a time so that the picture that it is taking is displayed on the monitor 66. The various controls of the control panel for the camera's mechanical and optical parts and the electronics for that same camera can be actuated.

In operation, the output of the image array of each of the cameras is sampled and its picture is displayed on the monitor 66. The monitor can have suitable indicia thereon, i.e., registration marks, for various points of the picture being taken, that is marks of the field of view, such as 142 of FIG. 1. When the output of a camera is being viewed on monitor 66, the controls for the mechanical and optical parts of the camera are adjusted to make sure that the depth of the field of the lens of that camera is correct, that the lens holder is positioned to make sure that the camera has the correct field of view relative to its spatial position 101–106. Likewise, the electronic control 68 can be actuated to adjust the hue, saturation, and brightness of the particular camera's video signal output.

The objective of this part of the system and step of the process as heretofore described is to make sure that the image from each of the plurality of spatially separated camera which is to be supplied to the computer 64 for digital processing has the desired characteristics from the point of view of depth field and position of the field of view of the object being photographed so that there are no errors introduced at the picture taking end of the process. If desired, there can be a plurality of monitors and controls 68, one for each camera.

The computer portion of the system includes a video capture circuit 76. Such circuits are well known in the electronic computer video graphics field. For example, the so-called TARGA video capture board. This board has the capability of taking a video image of a still or moving object from a suitable input source, such as a video camera of the type being described or a video cassette recorder, and digitizing it. Basically, the video capture board operates as a "frame grabber", i.e. it freezes a frame of a still or moving object and digitizes the image for further processing. Once the video signal is digitized, it is available for storage on a computer type storage medium, e.g., a floppy disk, hard disk, WORM (write once read many times) or CD storage medium, etc.

Video capture circuits 76 of the type being described can also be controlled by software "paint" type programs so that any part of the original video signal which has been digitized can be modified. For example, the angularity size and position of the electronic image can be changed, any part of the electronic image can be modified as to color, painted over, deleted or "air brushed", portions can be added to the digital image, etc. One suitable software program, for example, that used with the TARGA board, is TIPS®, which is produced by the maker of the board. Other suitable programs include PC Paintbrush®, Dr. Halo®, etc.

Other types of video capture circuits are also available in the art. Such capture circuits also have corresponding paint type programs.

The output of the video capture circuit is displayed on another video monitor 80. After the image has been processed into its desired form by the video capture circuit 76 and modified by its software program, that image is then stored in the storage medium 82. The output of each camera C is preferably taken sequentially so that the electronic picture from each camera is stored in its own file in memory for easy identification, access and further use.

Any suitable storage process and medium can be utilized in accordance with well known digital storage techniques utilized in the computer video graphics industry. For example, each complete picture from a camera can be stored by a bit mapping technique. In such bit mapping technique, each pixel of the picture is assigned a geographical coordinate location and a value corresponding to the color to be represented at such location. This permits the stored image to be either reproduced on a video monitor, used by apparatus for producing hard copy negatives, or used directly into a hard copy printing system.

To use the plurality of processed stored images of the object, one corresponding to each camera, in a video monitor, a computer aided design type (CAD) of technique can be utilized. In a CAD program the various parts of each image are stored in electronic layers. Each layer of an image can correspond to a color at the various locations over the entire surface of an object, etc. Such CAD techniques are also well-known in the art. Here, there would also be a further multiplicity of layers corresponding to the image from each of the plurality of cameras. The face of the monitor could be provided with a lenticular screen for direct viewing of the three-dimensional image 6.

Instead of using a CAD layer technique, there can be a direct display of the stored digital images. Another possibility is to directly display all at one time the plurality of video signals which would normally be directly displayed on the monitor 66.

Another use of the stored images is to project them onto a screen, such as by an electronics "overhead projector or viewer 85". That is, the stored image is converted into a display, for example on a cathode ray tube, which is projected onto a screen. Here, there would be a plurality of such projectors, one for each stored image. In this arrangement, there would be adjustment of each projector to make sure that there was proper registration.

A photographic negative reproducing apparatus 84 also can be connected to the output of the computer storage medium 82. This is a device which can produce photographic negatives from the stored digital information. Such devices are also well known in the art and could include, for example, a cathode ray tube monitor on which the digital information corresponding to the picture is reproduced and a photographic camera housing a film from which a negative can be made. The system would include only one such unit so that all of the electronic images of the object made from the same unit whose camera and cathode ray tube can be kept in a fixed, control relationship. This minimizes optics and registration error. The negatives of the plurality of images are then used to make the final three dimensional photographs.

Another way of using the stored images is to output the stored digital information into an electronic full color printing system 90, for example, a Linotype ® system. Such systems take digital information and directly convert it into plates which are used on printing machines. Thus, the stored digital information corresponding to the plurality of electronic images needed to make a stereoscopic photograph are directly converted into printed pictures.

In using the system to produce negatives on printing plates, it is not necessary to first store each image. That is, the output of the video capture digitizing circuit can be applied directly to the negative making machine or to the printing machine.

OVERALL SYSTEM OPERATION

To summarize, the preferred manner of operating the system, each of the electronic cameras C is set up relative to the object whose picture is to be taken. This can be accomplished, for example, by providing a frame on which the plurality of cameras are fixedly mounted or on which a single camera can be moved to the plurality of stations.

The alignment and registration of each camera is then checked by operating the video switch 60 to sequentially monitor the output of the camera at each station. At each camera station, the picture which is reproduced on monitor 70 is viewed and the controls 70, 72 and 74 are adjusted to control the optics and the electronics of the camera at each station to make sure that the picture taken by each camera picture field is within the desired field of view limits. If a single camera is used, the photographic field registration relative to the electronic imaging array of the camera is performed each time the camera is moved.

The recording of the picture from each camera station can take place under the control of the computer 64. While a single video capture circuit 76 which sequentially receives pictures from the various stations through the video switch is operated, it should be understood that a parallel system can be used. That is, there can be a separate video capture circuit 76 and corresponding monitor 80 connected to each of the cameras.

After the image from each camera is digitally adjusted in the video capture circuit via the appropriate software program, the image from that camera is stored. The same storage means can store the digitized image from each camera, i.e., in the example being described the storage medium will have six images, one corresponding to each camera. Where a separate video capture circuit is used for each of the cameras, there can also be a separate storage medium, although this is not absolutely necessary since most storage media have enough capacity to store the described six images.

The images which are digitally stored in the storage medium 82 are thereafter utilized as previously described for visualization or for producing some time of hard copy, such as being reproduced by the negative producing apparatus 84 or from the printing apparatus.

It should be understood that the object being photographed can be a moving object. That is, the cameras are video cameras which are capable of doing this. The output of each camera can be used directly by a corresponding video capture circuit 76 so that a selected frame can be processed and stored digitally. Alternatively, the output of each camera can be stored on magnetic tape so a selected frame from the tape of each camera can be used later.

Another alternative where the object being photographed is stationary, is to take the video signal output of each camera and store it sequentially on magnetic tape.

I claim:

1. Apparatus for electronically producing a stereoscopic photograph of an object comprising:
   electronic camera means having means for converting the received object of an image into an electrical video signal,
   optical means for establishing a field of view relative to the object being photographed to image on said electronic camera converting means,
   means for operating said electronic camera means and said optical means relative to each other to produce the same field of view of the object being photographed with the camera means located at each of plurality of predetermined positions which are spaced from each other and the image plane of the converting means being substantially parallel to the field of view object plane at each of said positions,
   means for digitizing each said video signal corresponding to each image, and
   means responsive to the plurality of digitized video signals for producing a viewable output corresponding to the plurality of photographs taken by said camera means.

2. Apparatus as in claim 1, wherein said operating means is responsive to the video signals produced by the converting means.

3. Apparatus as in claim 1 wherein said means for producing a viewable output comprises a monitor on which said plurality of digitized video signals are displayed.

4. Apparatus as in claim 1 wherein said means for producing a viewable output comprises projector means.

5. Apparatus as in claim 1 wherein said means for producing a viewable output comprises means for producing a photographic negative of each the digitized video signal corresponding to each image.

6. Apparatus as in claim 1 wherein said means for producing a viewable output comprises means for producing at least one plate for a printing press directly from said digitized video signals.

7. Apparatus as in claim 1 wherein said means for digitizing further comprises means for varying the characteristics of the digitized signal.

8. Apparatus as in claim 1 further comprising means for storing each of said digitized video signals.

9. Apparatus as in claim 8 further comprising means for storing each of said video signals prior to the digitizing thereof.

10. Apparatus as in claim 1 further comprising means for viewing the video signal corresponding to an image prior to it being digitized, and means for adjusting the camera means to adjust the video signal.

11. Apparatus as in claim 10 wherein said operating means comprising means for setting said optical means for the image to have a predetermined depth of field and field of view of the object relative to said converting means.

12. Apparatus as in claim 11 wherein said adjusting means further comprises means for adjusting the electrical video signal characteristics.

13. Apparatus as in claim 1 wherein said camera means further comprises a lens having an optical center and wherein said converting means of a camera comprises generally planar means,
 means for mounting the generally planar converting means of the camera in a common first plane at each of said locations,
 and said utilization means including means for shifting the optical center of the lens in a plane substantially parallel to the plane of the converting means at each position to compensate for the difference in position of said electronic camera means relative to said object at each said photograph taking position.

14. Apparatus as in claim 13 wherein said lens shifting means shifts the optical center of the lens at each position of the electronic camera means to be on the same focus point of the object.

15. Apparatus as in claim 13 wherein said lens shifting means shifts the lens to have the same field of view at each position of said electronic camera means.

16. Apparatus as in claim 13 wherein said lens is in a common plane which is parallel to said first plane at all said positions.

17. Apparatus as in claim 13 wherein said means for maintaining the camera converting means plane in the common first plane comprises an elongated rigid frame means, said camera means being positioned along said frame means at each said position.

18. Apparatus as in claim 17 wherein there is a single electronic camera means which is positioned along said frame means to establish each of said positions.

19. Apparatus as in claim 17 further comprising a plurality of camera means respectively positioned along said frame means to establish said plurality of positions.

20. Apparatus as in claim 13 wherein said lens shifting means comprises means for shifting the lens relative to the camera and its converting means.

21. Apparatus as in claim 20 wherein said camera means includes a camera body and said lens shifting means comprises a flexible light tight housing having one end attached to said camera body, said lens being attached to the other end of the light tight housing, and means for moving said lens relative to said camera body.

22. Apparatus as in claim 21 further comprising means for moving said camera body.

23. A method of electronically photographing an object for producing a three dimensional photograph of said object comprising the steps of
 providing an electronic camera having an element for converting a received image of the object photographed into an electronic video signal,
 taking a photograph of said object using substantially the same field of view with said camera at each of a plurality of predetermined positions spaced at a distance from each other,
 digitizing the video signals produced by said converting means at each said location, and
 utilizing the plurality of digitized video signals to produce a viewable output.

24. A method according to claim 23 wherein the step of digitizing said video signals further comprises modifying the characteristics of the digitized signal.

25. A method according to claim 23 further comprising the step of storing the video signal corresponding to each photograph prior to digitizing.

26. A method according to claim 23 further comprising the step of storing the plurality of digitized video signals.

27. A method according to claim 23 wherein the step of providing an electronic camera further comprises providing a camera with an optical lens, and further comprising the steps of
 viewing said digitized video signals on a monitor and adjusting said lens system to control the field of view and focal length of the lens.

28. A method as in claim 27 wherein the step of adjusting is carried out to make the extremities of the field of view of the lens the same at each camera position.

29. A method as in claim 23 wherein the step of providing an electronic camera further comprises providing a lens system for said camera and placing the camera converting element in a plane,
 and the step of taking a photograph at each position 30. A method as in claim 29 wherein the step of shifting the optical center of the lens comprises moving the lens relative to the camera.

31. A method as in claim 29 wherein the optical center of the lens is in a common plane at each said camera position.

32. A method as in claim 29, wherein the optical center of the lens at each position of the camera is on the same focus point of the object.

33. A method as in claim 32 wherein the extremities of the field of view of the lens at each said position is the same 34. A method as in claim 32 wherein the optical center of the lens is in a common plane at each said camera position.

* * * * *